United States Patent
Ramme

[11] Patent Number: 5,376,874
[45] Date of Patent: Dec. 27, 1994

[54] CHARGING CIRCUIT FOR A LEAD-ACID STORAGE BATTERY

[75] Inventor: Friedrich Ramme, Berlin, Germany

[73] Assignee: Robert Bosch GmbH, Stuttgart, Germany

[21] Appl. No.: 77,621

[22] Filed: Jun. 15, 1993

[30] Foreign Application Priority Data

Jun. 29, 1992 [DE] Germany .................. 4221299

[51] Int. Cl.$^5$ ................................. H02J 7/00
[52] U.S. Cl. ................................. 320/21; 320/32
[58] Field of Search .................. 320/13, 14, 15, 21, 320/27, 28, 31, 32, 39, 40

[56] References Cited

U.S. PATENT DOCUMENTS

| | | | |
|---|---|---|---|
| 4,371,826 | 2/1983 | Shelly | 320/21 |
| 4,389,608 | 6/1983 | Dahl | 320/33 |
| 4,656,411 | 4/1987 | Carlson | 320/21 X |
| 4,897,591 | 1/1990 | Spani | 320/32 |
| 5,177,677 | 1/1993 | Nakata et al. | 320/21 X |
| 5,192,905 | 3/1993 | Karlin et al. | 320/23 |
| 5,227,712 | 7/1993 | Boman | 320/21 |

FOREIGN PATENT DOCUMENTS

2085245  4/1982  United Kingdom .................. 320/21

OTHER PUBLICATIONS

MT 9002 SN Charge Unit, Robert Bosch Gmbh, Portable Telephone, Edition 1 (Oct. 1991), pp. 9–11.

*Primary Examiner*—Kristine L. Peckman
*Attorney, Agent, or Firm*—Frishauf, Holtz, Goodman & Woodward

[57] ABSTRACT

A charging circuit for a lead-acid storage battery for a mobile radio transceiver which operates effectively with an input from a vehicular battery terminal that may vary over a range of 25 volts in output voltage has a control circuit for regulating the charging current connected between the charging current output and the same control input of the same pulse width modulator that is used for output voltage control. The pulse width modulator is part of an integrated circuit which includes also a d.c. to d.c. voltage converter and an output voltage regulator. A branch circuit includes a current sensing resistor (45) of less than 1 ohm. The voltage drop across said sensing resistor is too small to control a control transistor network (46, 52) and therefore a constant voltage is added thereto by a voltage adding resistor network (56, 57, 47, 48) coupled to said transistor network.

5 Claims, 1 Drawing Sheet

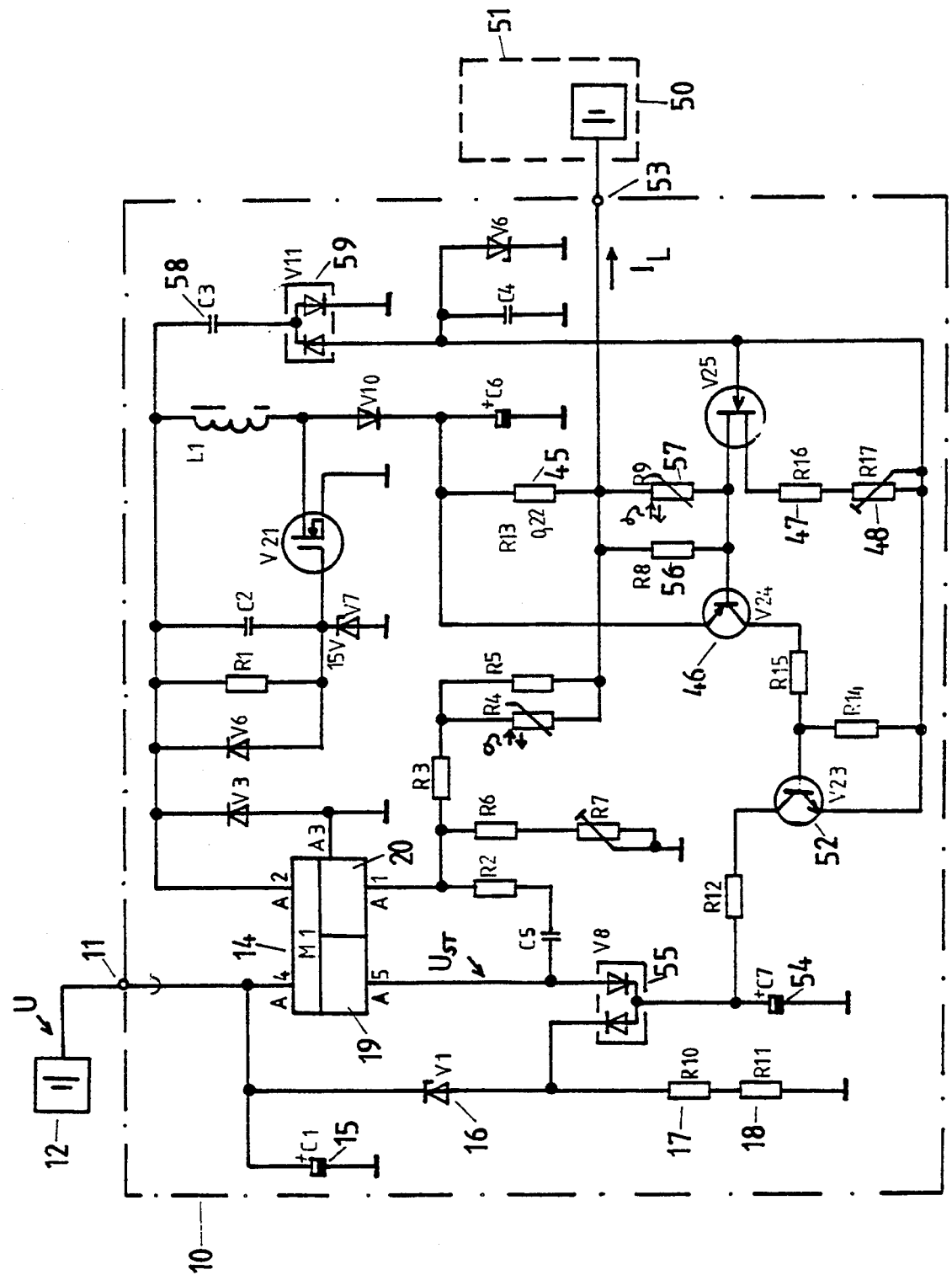

CHARGING CIRCUIT FOR A LEAD-ACID STORAGE BATTERY

FIELD OF THE INVENTION.

This invention concerns a charging circuit for a lead-acid storage battery from a direct current source of variable voltage of the kind containing an integrated d.c. to d.c. voltage converter having a pulse width modulator and a voltage regulator for regulating the charging voltage.

BACKGROUND

The charge unit type MT 9002 SN manufactured by Robert Bosch GmbH has a charge circuit for radio telephone equipment of this type. This known charging circuit utilizes an upwards d.c. voltage converter and correctly charges a storage battery in spite of input d.c. voltage that may fluctuate from, for example, 8 to 15 volts. This known charging circuit, however, cannot regulate out the effect of voltage fluctuations over a substantially greater range.

THE INVENTION

It is an object of the present invention to provide a charging circuit for a lead-acid storage battery that is capable of providing a suitable charging output, e.g. at about 15 V, even when the d.c. energy source is of variable voltage, which may vary over a range of 25 volts and, in general, to provide a regulated current and voltage source adapted to receive input voltage varying over a wide range.

Briefly, an integrated-circuit d.c. to d.c. voltage converter of a known type is used which includes a pulse width modulator for regulating the charging voltage. The invention provides control of the charging current by acting on the same pulse width modulator. More particularly, a low-ohm resistor is provided in the charging circuit and the voltage drop across its terminals produced by the charging current determines the magnitude of a control voltage for the pulse width modulator. A constant d.c. voltage is added to the voltage drop just mentioned for controlling a first transistor for controlling the pulse width modulator, preferably through a second transistor. The second transistor serves to discharge a capacitor and thereby reduces the control voltage for the pulse width modulator. It is also advantageous in the practice of the invention to obtain an auxiliary voltage to enable the charging current regulation to be effective all the way to a short circuit of the output. For that purpose a second capacitor and a diode circuit is interposed between the unregulated d.c. to d.c. voltage converter output and ground or chassis.

The charging circuit of the invention is distinguished by the low total cost of its components and the resulting economy. It has a low cost nearly constant loss-power, quite independent of the operating point at the output of the charging circuit.

DRAWING

The invention is further described by way of an illustrative example with reference to the annexed drawing, wherein the sole figure is a circuit diagram of the charging circuit in which the d.c. to d.c. converter, its control modulator and its voltage regulator are shown in a single block 14.

DETAILED DESCRIPTION.

The drawing is a diagram of a circuit for charging the lead-acid storage battery 50 of a mobile telephone 51 from an input from a d.c. voltage source, shown as an automobile storage battery 12. 10 designates the charging circuit as a whole, which has an input terminal 11 for connection to the d.c. voltage source 12. Battery 12 has a fluctuating d.c. voltage U and, as already mentioned, is typically a lead-acid storage battery installed in a motor vehicle.

The input connection 11 of the charging circuit is connected to the input terminal A4 of a d.c. to d.c. voltage converter 14. Converter 14 has five terminals A1 to A5, the terminal A2 being the unregulated output voltage terminal, the terminal A1 being a regulated voltage output terminal, the terminal A5 being a control voltage input terminal for the pulse width modulator 19 built into the d.c. to d.c. converter 14 and the terminal A3 being the terminal for a connection to ground or the chassis of the circuit.

A capacitor 15 is connected between ground and the input terminal A4 of the d.c. to d.c. converter and that terminal is also connected to a series branch circuit containing the Zener diode 16 and two resistors 17 and 18 leading to ground or chassis. The d.c. to d.c. converter includes also a voltage regulator 20 for regulating the charging voltage made available at the terminal A1, which is connected through a network of resistors R3–R7 to the output terminal 53 of the charging circuit which also forms the input for the storage battery 50.

In accordance with a feature of the invention, a resistor 45, of a resistance less than 1 ohm, for example 0.25 ohm, is connected in parallel the input to the storage battery 50. Resistor 45 is connected to the emitter electrode of a transistor 46 and also to one electrode of a capacitor C6 of which the other electrode is connected to ground or chassis. Resistors 56 and 57 are connected in parallel, to the base electrode of the transistor 46, and to the resistor 45 and its connection to the transistor 46. This base electrode is connected through a field effect transistor V25 to a series connection of resistors 47 and 48. The resistors 47, 48 are connected to the drain electrode of the field effect transistor V25 and to the emitter of a second transistor 52. The collector of the first transistor 46 is connected through a resistor R15 to the base electrode of the second transistor 52. A resistor 14 connecting the emitter and base electrodes of the transistor 52 completes the resistor network that controls the output of the second transistor 52. The collector of the second transistor 52 is connected to the control input A5 of the pulse width modulator portion 19 of the d.c. to d.c. voltage converter 14 through the resistor R12 and the diode unit 55 of which the common connection is also connected to ground through a capacitor 54.

The unregulated voltage output A2 of the d.c. to d.c. voltage converter 14 is connected through a capacitor 58 and the ungrounded diode of a diode cascade unit 59 to the gate electrode of the field effect transistor V25 and to the terminal of the series-connected resistors 47 and 48 which is also connected to the emitter of the second transistor 52.

Operation of the circuit

An output voltage of about 15 volts at the output connection 53 of the charging circuit is to be compared with a variable input voltage at the input connection 11 of the charging circuit. The voltage at terminal 11 may extend over the range from 10 volts to 35 volts. By selection of a capacitor 15 rated for higher voltage, a range from 15 to 40 volts can be accommodated. An input voltage limit for lower voltages is provided by the Zener diode 16 and the capacitor 54 connected to the terminal 11 and by a diode of the diode antiparallel unit 55. Operation with more or less equal input and output voltage does not have any switchover point or switchover jump because of the continuous variation of the keying ratio of the pulse width modulator 19 at its fixed operating frequency, which may be 60 Hz. The current limitation by the pulse width modulator portion 19 of the d.c. to d.c. voltage converter 14 operates down to 0 volts. Thus there is assured a rectangular output characteristic for both current and voltage.

The resistor 45 serves as a current measuring shunt and produces a voltage drop of 0.27 volts and at an output current of 1 ampere. This voltage drop is not sufficient to turn ON the transistor 46.

In accordance with a feature of the invention, a constant voltage which is generated at the resistances 56 and 57 is added to the voltage drop of the resistance 45. The resistances 56 and 57 are normally in series with the resistors 47 and 48.

In consequence the first transistor 46 is turned ON at output currents greater than 1 ampere and it, in turn, turns ON the second transistor 52. The latter discharges the capacitor 54 and draws down the control voltage of the pulse width modulator 19 portion of the d.c. to d.c. voltage converter 14. The consequence of the now smaller keying ratio is that less energy is stored in the storage choke L1.

That energy stored in clock L1 is always exactly switched over as may be necessary for maintaining the output current of 1 ampere. In order to control the current at the output all the way down to short circuit of the output, the current regulation operates at −6.8 volts. This auxiliary voltage is generated by the charging pump composed of the capacitor 58 and the diode circuit 59.

The operating voltage range is limited at the bottom of that range by means of the series connection of the resistances 17 and 18 and the Zener diode 16.

The circuit of the invention makes it possible to utilize, for current regulation, the same pulse width modulator that is used for voltage regulation.

The following table identifies examples of suitable components for each of the circuit components of the charging circuit 10 which are identified by a simple number. Additional components other than resistors, capacitors and diodes are also listed in the table below. The unlisted resistors, capacitors and diodes relate to circuit functions that are known in the prior art. The appropriate values of those resistances and capacitances and the appropriate types of diodes are therefore known to persons skilled in the art.

| Ref. No. | Component | |
|---|---|---|
| 14, 19, 20 | [controller] integrated circuit MC 34166 or 33166 | |
| 15 | electrolytic capacitor C ≧ 1 μF | 20% |
| 16 | Zener diode U$_z$ × 6.8 V | 10% |
| 17<br>18 | resistor 1k + 1k | 10% |
| 46 | standard PNP bipolar transistor | |
| 52 | standard NPN bipolar transistor | |
| 54 | electrical capacitor C = 10 μF | 10% |
| 55 | standard universal rectifier | |
| 56 | resistor R = 3 k 3 ohm | 10% |
| 57 | NTC resistor R = 25 kilo ohm | 20% |
| 58 | film or chip capacitor C = 2 n 2 F | 20% |
| 59 | like 55 | |
| V21 | power switching MOS-FET like MTP 3055 E | |
| V25 | self-conducting N-channel depletion junction FET | |

Although the invention has been described with reference to a particular illustrative example, it will be recognized that variations and modifications are possible within the inventive concept.

I claim:

1. A circuit for charging a lead-acid storage battery (50) with electric power from a d.c. source (12) which varies in voltage by substantially more than 10 volts between minimum and maximum voltage values, said charging circuit having an integrated d.c. to d.c. voltage converter circuit (14) including a pulse width modulator portion (19) and a voltage regulator portion (20) for regulating the voltage of the charging power, said charging circuit having an output (53) for connection to said lead-acid storage battery (50) to be charged, said pulse width modulator portion (19) of said integrated circuit (14) having a control input (A5);

a supplementary circuit branch connected between said output (53) and said control input (A5) for regulation of the current ($I_L$) of the charging power, said supplementary circuit branch including a first resistor (45) having a resistance of less than 1 ohm connected to said output (53) for producing a voltage drop in said circuit branch which is subject to voltage variations;

a resistance network comprising a plurality of resistances (56, 57, 47, 48) in said circuit branch connected to said first resistor (45) for adding a substantially constant voltage to said voltage drop across said first resistor (45);

a first transistor (46) coupled to said control input (A5) of said pulse width modulator portion (49) of said integrated circuit (14), and supplying a control voltage to said control input; and wherein said added voltage formed by the voltage drop across said first resistor (45) and said substantially constant voltage derived from said resistance network is coupled to and applied to said first transistor (46) to control the current flow therethrough.

2. The circuit of claim 1, further including a second transistor (52) controlled by the output of said first transistor (46), said second transistor being connected in circuit between said first transistor (46) and said control input (A5) of said pulse width modulator portion (19) of said integrated circuit (14).

3. The circuit of claim 2, including a connection of an output electrode of said second transistor (52) to said control input (A5) of said pulse width modulator portion (19) of said intergrated circuit (14), said connection comprising a first capacitor (54) having one terminal coupled to said control input (A5) and another terminal connected to ground or chassis so that, when said second transistor (53) is conducting, the first capacitor (54) discharges and in consequence voltage at said control input (A5) of said pulse width modulator portion (19) of said integrated circuit (14) is reduced.

4. The circuit of claim 3, further including a current control circuit to control current flow at said output (53), said current control circuit being connected to an unregulated voltage output (A2) of said integrated circuit (14), said current control circuit comprising a second capacitor (58) and a diode network (59), said diode network having a shunt diode connected to said ground or chassis, and a series diode coupled to said second transistor (52).

5. The circuit of claim 4, wherein said current control circuit further comprises a parallel combination of a third capacitor (C4) and a Zener diode (V6), said parallel combination being connected between said ground or chassis and to a gate electrode of a field effect transistor (V25), main electrodes of said field effect transistor being connected in circuit with a control electrode of said first transistor (46) and with said second transistor (52).

* * * * *